Jan. 29, 1952

F. J. HOLIK

TONE ARM HOLDER

Filed Oct. 7, 1949

2,583,845

Inventor

Frank J. Holik

By Clarence A. O'Brien and Harvey B. Jacobson

Attorneys

Patented Jan. 29, 1952

2,583,845

UNITED STATES PATENT OFFICE 2,583,845

TONE ARM HOLDER

Frank J. Holik, Amarillo, Tex.

Application October 7, 1949, Serial No. 120,077

1 Claim. (Cl. 274—1)

This invention relates to phonographs, and more particularly to an apparatus for supporting the tone arm while it is being transported from one site to another.

An object of this invention is to provide an apparatus for holding the tone arm of a phonograph in a relatively rigid position when it is being transported from the home to a repair shop, or when being transported from any particular site to another.

A further object of the invention is to provide a tone arm holder that is provided with a sponge rubber or other cushioning insert which conforms to the configuration of the tone arm and will relatively rigidly support it while preventing it from being scratched by another hard surface.

Yet another object resides in the provision of a tone arm holder that can be either pressed or molded from suitable plastic material, preferably those of thermal setting characteristics, which while light and attractive, are strong enough to hold the tone arm relatively rigid.

Additional objects of the invention reside in the provision of a tone arm holder that is strong, durable, efficient in operation, simple in construction and design, easy to manufacture, and relatively inexpensive.

These, together with the various ancillary objects of the invention which will become apparent as the following description proceeds, are attained by this tone arm holder, a preferred embodiment of which has been illustrated, by way of example only, in the accompanying drawings, wherein.

Figure 1:
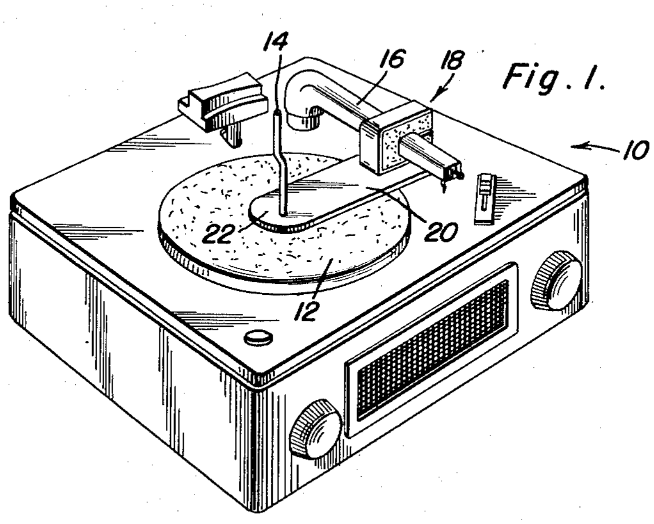
Figure 1 is a perspective view of the invention, showing the tone arm holder in operative emplacement and use supporting a tone arm of a phonograph.
Figure 2:
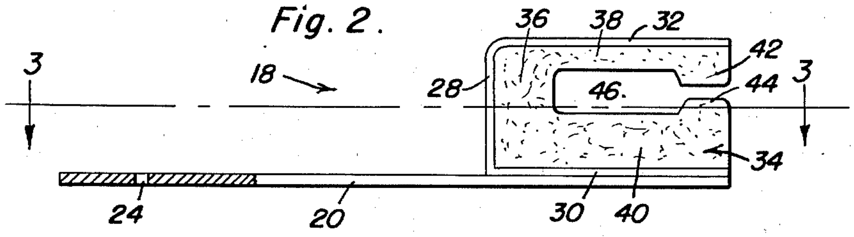
Figure 2 is a side elevational view of the tone arm holder comprising the present invention.
Figure 3:
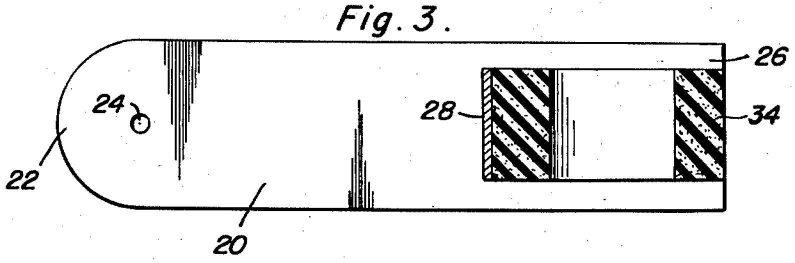
Figure 3 is a horizontal sectional view as taken along line 3—3 in Figure 2; and, Figure 4 is a end elevational view of the device to be further disclosed.
Figure 4:
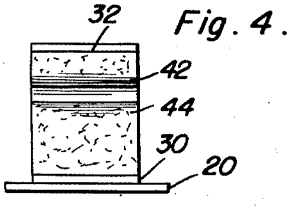

With continuing reference to the accompanying drawings wherein like reference numerals designate similar parts throughout the various views, 10 generally designates a phonograph on which the tone arm holder comprising the present invention is to be operatively emplaced when the phonograph is being transported from site to site. The phonographs are of conventional design and are provided with a turn table 12 which has a spindle 14 upwardly extending therefrom. Furthermore, the phonograph is provided with a tone arm 16 of desired configuration.

The tone arm holder comprising the present invention is generally designated by reference numeral 18 and is adapted to selectively retain the tone arm 16 in a relatively rigid predetermined position when the phonograph 10 is being transported from one location to another. The tone arm holder includes a base plate 20 which is provided with a semi-circular end portion 22 having a central aperture 24 therein through which the spindle 14 of the phonograph is adapted to be emplaced. The base plate 20 is also adapted to rest upon the turn table 12 of the phonograph. At the other end 26 of the base plate 20, a substantially U-shaped holding member is provided.

The U-shaped member comprises a central connecting portion 28 and two substantially parallel extending legs 30 and 32. It is to be noted that the free ends of the legs 30 and 32 are oppositely disposed from the aperture 24. A cushion of sponge rubber, or other resilient material is emplaced within the U-shaped member so as to provide a cushion or rest for the tone arm. This cushion is generally designated by the reference numeral 34 and comprises a central connecting portion 36 together with parallel extending legs 38 and 40 which have projections 42 and 44 extending toward each other at their outermost ends. The leg 40 of the cushion 34 is substantially bigger than the leg 38 since the tone arm will rest thereon. The projections 42 and 44 provide a maintaining or retaining catch for the tone arm to prevent it from accidentally slipping out of the cushion 34.

When the phonograph is being transported from one place to another, the tone arm holder 18 is positioned upon the turn table 12 with the spindle 14 passed through the aperture 24. The tone arm is then pushed through the narrow channel formed by the projections 42 and 44 into the opening 46 formed between the legs of the cushion 34. Then, the phonograph may be easily transported without fear of the tone arm striking against the spindle 14, or any other close object, or rotating freely so as to damage the mechanism therein.

This tone arm holder may be conveniently made by molding from suitable plastic material, or may be fabricated from two pieces of plastic material which are then secured together. Obviously, however, this tone arm holder is capable of being easily made from sheet metal, preferably those of light weight, such as aluminum or magnesium alloys.

Since from the foregoing, the construction and advantages of this tone arm holder are readily apparent, further description is believed to be unnecessary.

However, since numerous modifications will occur to those skilled in the art after a consideration of the foregiong specification and accompanying drawings, it is not intended to limit the invention to the precise embodiment of tone arm holder shown and described, but all suitable modifications and equivalents may be resorted to which fall within the scope of the appended claim.

Having described the invention, what is claimed as new is

A tone arm holder for a phonograph comprising a base, said base having an aperture therethrough adjacent one end, said aperture adapted to fit over the record positioning spindle of a phonograph turntable, a substantially U-shaped member secured to said base adjacent the other end of said base, the legs of said member extending parallel to said base, a U-shaped resilient liner in said U-shaped member, said resilient liner being thickened adjacent the open end thereof to provide a resilient retaining means for said tone arm.

FRANK J. HOLIK.

REFERENCES CITED

The following references are of record in the file of this patent:

UNITED STATES PATENTS

| Number | Name | Date |
|---|---|---|
| 1,915,906 | Thomas | June 27, 1933 |
| 1,930,544 | Victor | Oct. 17, 1933 |
| 2,035,473 | Harrison | Mar. 31, 1936 |
| 2,489,685 | Sultan | Nov. 29, 1949 |